United States Patent
Kurzmann et al.

(10) Patent No.: US 8,234,947 B2
(45) Date of Patent: Aug. 7, 2012

(54) TRANSMISSION ARRANGEMENT HAVING AXIAL SECURING ELEMENT

(75) Inventors: Rainer Kurzmann, Achern (DE); Klaus Oberle, Kippenheim (DE); Danny Werner Gottschalk, Gernsbach (DE); Manfred Winter, Lichtenau (DE)

(73) Assignee: Robert Bosch GmbH, Stuttgart (DE)

( * ) Notice: Subject to any disclaimer, the term of this patent is extended or adjusted under 35 U.S.C. 154(b) by 468 days.

(21) Appl. No.: 12/439,080

(22) PCT Filed: Aug. 14, 2007

(86) PCT No.: PCT/EP2007/058385
§ 371 (c)(1),
(2), (4) Date: Oct. 28, 2009

(87) PCT Pub. No.: WO2008/025669
PCT Pub. Date: Mar. 6, 2008

(65) Prior Publication Data
US 2010/0107793 A1 May 6, 2010

(30) Foreign Application Priority Data
Sep. 1, 2006 (DE) .................. 10 2006 041 076

(51) Int. Cl.
*F16H 1/12* (2006.01)
*F16H 1/20* (2006.01)
*F16H 35/06* (2006.01)
*F16H 35/08* (2006.01)

(52) U.S. Cl. ............................... 74/421 R; 74/395
(58) Field of Classification Search .................... 74/395, 74/406, 409, 421 R, 425, DIG. 10, 451; 403/292
See application file for complete search history.

(56) References Cited

U.S. PATENT DOCUMENTS

| 4,214,568 A | 7/1980 | Ito et al. |
| 6,086,757 A * | 7/2000 | Wilcher ........................ 210/159 |
| 6,446,523 B1 * | 9/2002 | Ota et al. ........................ 74/432 |

FOREIGN PATENT DOCUMENTS

| DE | 33 303 30 | 3/1985 |
| DE | 102 46 711 | 4/2004 |
| EP | 0 672 812 | 9/1995 |
| FR | 494111 | 8/1919 |
| FR | 2122773 | 9/1972 |
| GB | 414965 | 8/1934 |

* cited by examiner

*Primary Examiner* — Justin Krause
(74) *Attorney, Agent, or Firm* — Merchant & Gould P.C.

(57) ABSTRACT

The invention relates to a transmission arrangement, particularly for adjusting devices in motor vehicles, comprising a gear wheel, which is secured against axial displacement on an axis or a shaft by means of securing element. According to the invention, the axis or the shaft is made of plastic. The securing elements comprise at least a molded part, which has at least one axial stop for the direct or indirect support of the gear wheel, and the molded part is secured by means of a screw against axial displacement on the axis or the shaft.

20 Claims, 3 Drawing Sheets

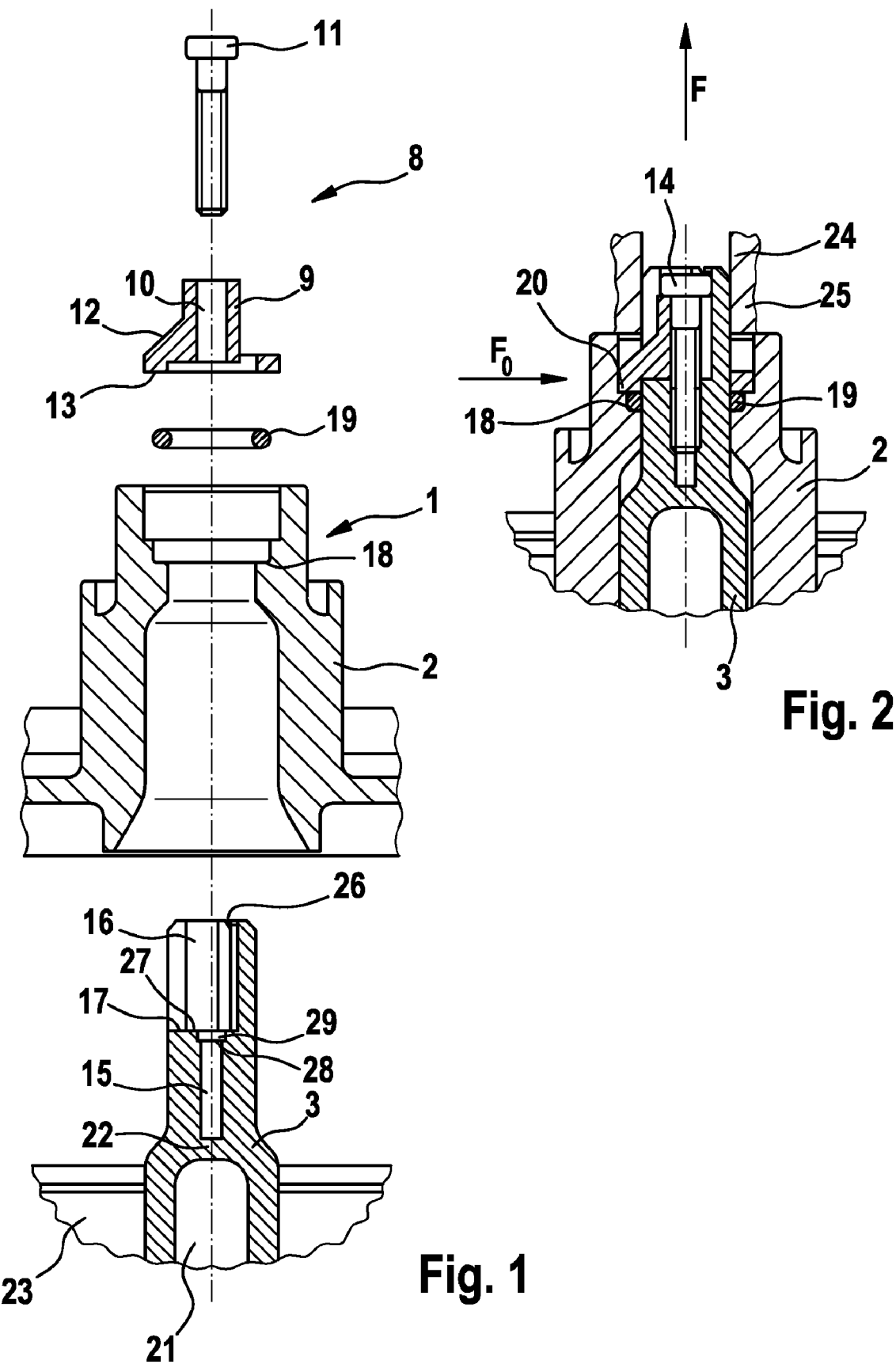

100
TRANSMISSION ARRANGEMENT HAVING AXIAL SECURING ELEMENT

TECHNICAL FIELD

The invention concerns a transmission arrangement.

BACKGROUND

Such transmission arrangements are for example used for adjusting devices in motor vehicles, like power windows or sun roofs, which are operated by an electromotor. Hereby an electromotor is used, which particularly adjusts for example a window between an opening- and a closing-adjustment over a transmission. The gear wheel is thereby usually arranged as a tappet and provides a worm gearing, with which it is operated over a driving worm, which is connected with the electromotor. A hoisting drum is put on the tappet, which transfers the torque of the electromotor onto a power window system. Due to the angle of gradient of the worm gearing an axial force has an effect on the tappet, so that a securing against axial displacement of the gear wheel on the axis or the shaft has to be provided. The axis or the shaft, on which the gear wheel is arranged, is usually build of metal, whereby the axis or the shaft is fixed at a housing made of plastic. It is known for realizing the securing against axial displacement to provide a securing ring in a circumferential groove of the axis or shaft, so that the gear wheel can be supported at this securing ring in axial direction. The familiar transmission arrangement has the disadvantage that it provides a relatively high weight due to the axis or shaft being out of metal. Furthermore the torque-proof fixation of the metal axis or the bearing of the spinning metal shaft at the plastic housing is complex.

SUMMARY

Therefore, the invention is based on the task to suggest a transmission arrangement with reduced weight as well as with applicable axial securing means.

The invention is based on the idea to build the axis or the shaft of plastic. The axis is preferably built in one piece with a transmission housing, so that an otherwise necessary attaching step and a separate component can be omitted. The axial securing that is known for metal axes or metal shafts in the form of a securing ring does not qualify at axes or shafts made of plastic, because the groove, which is required for mounting the securing ring, can only be realized with a very high effort from a technical view. Furthermore a swinging of the groove and therefore an increasing axial play of the gear wheel has to be expected due to the lower firmness of the plastic as opposed to metal. According to the invention a molded part comprising at least one axial stop for supporting the gear wheel is therefore provided instead of a securing ring that is incorporated in a groove, whereby the molded part is secured against an axial displacement at the plastic axis or the plastic shaft by a screw, particularly a metal screw. Then there is no risk of a swinging of the axial securing according to the invention during operation. If necessary the gear wheel can be made of two parts, as it is known for example from DE 102 46 711 A1, in order to provided damping elements for damping the transmission components in circumferential direction. Preferably the screw is screwed in to the axis or shaft at the front side, whereby the molded part is held solid between screw head and axis or shaft. The axial stop is then created by a sector of the molded part that sticks out radial over the outer circumference of the axis or shaft, against which the gear wheel, made of one or several pieces, can be directly or indirectly supported in axial direction.

As an improvement of the invention the advantage is provided that the screw for fixing the molded part at the axis or shaft is arranged as thread forming screw. In doing so it is not necessary to already provide an internal thread for taking in the screw when assembling the axis or the shaft, which makes the assembling significantly easier. It is sufficient to provide a blind hole with a particularly even internal circumferential wall, in which the screw cuts an internal thread when mounting.

In an embodiment of the invention the advantage is provided, that the molded part is incorporated in a front sided recess of the axis or shaft especially including the screw. In doing so the fixing means do not stick out in axial direction over the axis of shaft, whereby installation space can be saved, which is already tight.

According to a practical improvement of the invention it is provided, that the axial stop for a direct support of the gear wheel is arranged as preferably circumferentially closed ring section of the molded part. According to an alternative embodiment the axial stop for a direct support of the gear wheel can also be arranged as separate ring part, which again is supported at the molded part or at an axial stop of the molded part. In the latter case the molded part serves for a indirect, which means mediate, axial support of the gear wheel. By the annular arrangement of the direct axial stop a preferably big stop area is provided, whereby the distributed load can be reduced.

In order to avoid the entering of moisture between the axis or shaft and the gear wheel into the area that lies behind that, one embodiment of the invention provides a ring seal around the axis or shaft, which preferably lies on a ring area of the gear wheel and presses radial against the gear wheel as well as the axis or shaft. In order to realize an optimal seal compression, one improvement of the invention provides that the ring section or the separate ring part is used for the seal compression. In doing so the ring section or the ring part has a double function. One the one hand it serves as direct axial stop for the gear wheel and on the other hand simultaneously for the seal compression of the ring seal. For the axial support of the ring section or ring part a radial nib is advantageously provided at the molded part. It sticks out in radial direction over the outer circumference of the axis or the shaft. Depending on the embodiment of the invention the nibs are build in one piece with the ring section or only in one piece with the molded part, whereby the ring part is then directly supported at the nibs in radial direction.

Preferably three nibs are provided in order to realize an equal support of the ring sector or the ring part. It is significant that the nibs are arranged equally over the circumference of the molded part, in particular in a circumferential distance of 120°.

For securing the molded parts against a twisting, one embodiment of the invention provides that for each nib one radial slot is provided in the circumferential wall of the front sided recess, in which the molded part is at least partially incorporated. The nibs stick out of the radial slots in radial direction and create an axial stop for the ring section or the ring part and therefore for the gear wheel. Preferably the nibs lie on the slot bottom in mounted status, thus they are impinged with power by the screw head in the direction of the slot bottom.

In order to find the radial slots easier when mounting, it is provided in an embodiment of the invention that the radial slots are arranged in the axial front part, whereby inlet slopes for the nibs are created.

In order for the axis or the shaft to incorporate shear forces better, an embodiment of the invention provides a radial support for the axis or shaft. Preferably the radial support is arranged as a forming hole in a bearing part, in which the axis or shaft encroaches in axial direction.

BRIEF DESCRIPTION OF THE DRAWINGS

Further advantages and practical embodiments of the invention are stated in further claims, the description of the figures and the figures.

It is shown:

FIG. 1 is a cut explosion illustration of a transmission arrangement in extracts, FIG. 2 is a cut view of the mounted transmission arrangement according to FIG. 1.

DETAILED DESCRIPTION

Figure 3:
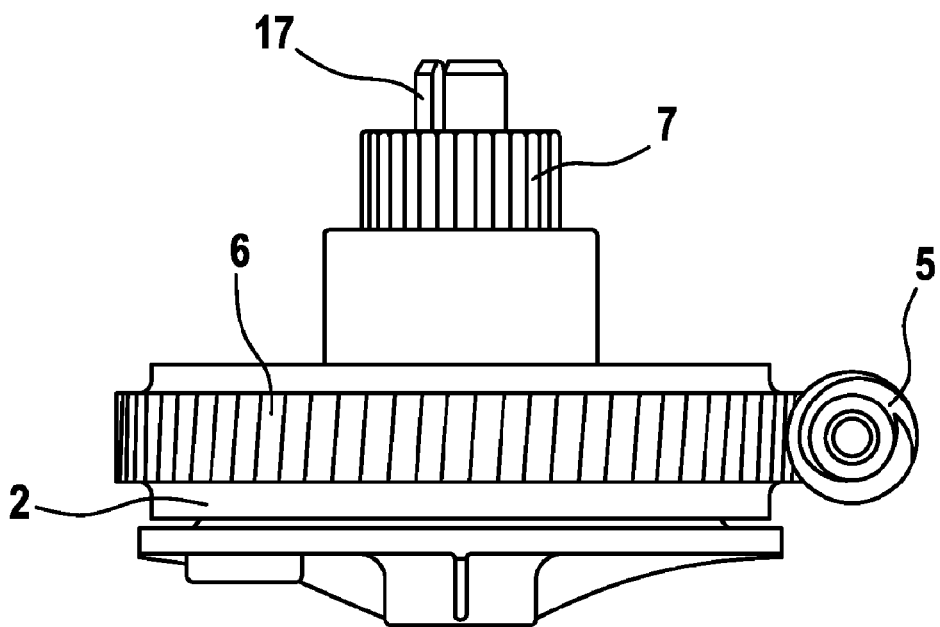
FIG. 3 is a side view of the mounted transmission arrangement.
Figure 4:
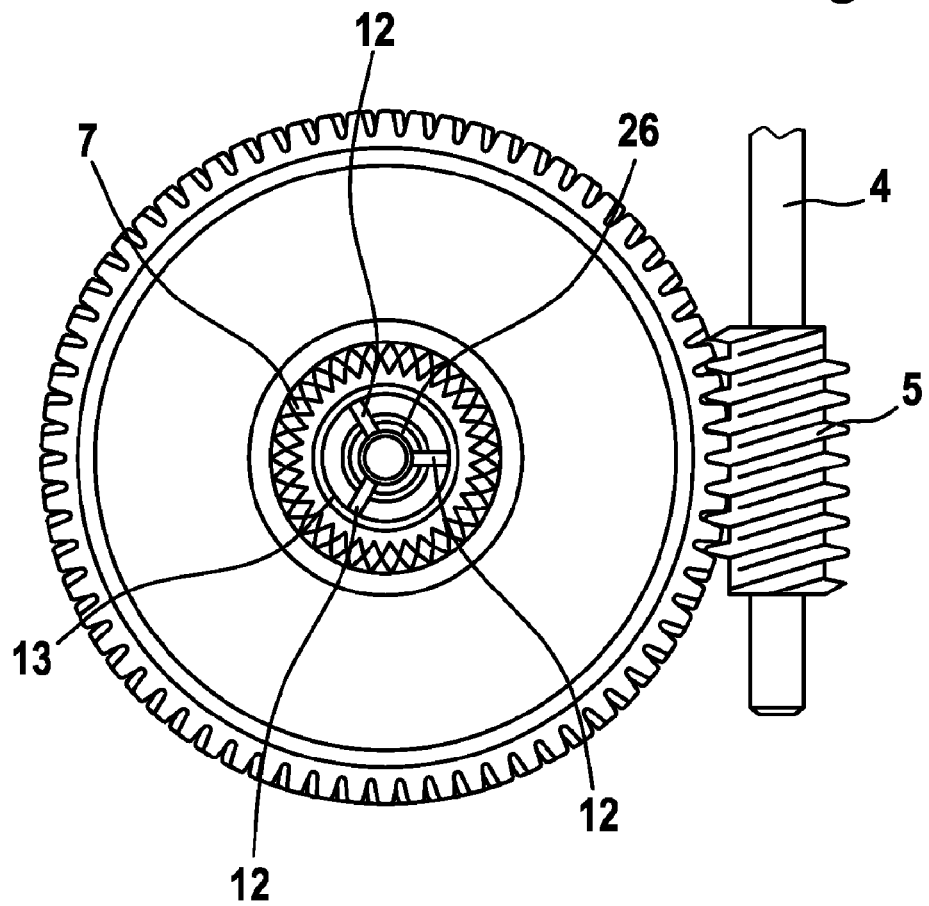
FIG. 4 is a top view of the mounted transmission arrangement.

In the figures, the same components and components with the same function are labeled with the same reference signs.

At first, the embodiment in FIGS. 1 to 4 is explained. The figures show a transmission arrangement 1. It provides a gear wheel 2, which is arranged as tappet and which is pivoted on an axis 3 that is arranged as a bolt. A worm 5, that is arranged torque-proof on a motor shaft 4, combs with a worm gear 6 at the big outer circumference of the gear wheel 2, whereby the gear wheel 2 is twisted. With an axial distance to the worm gear 6, an external tooth system 7 with a small circumference is provided, onto which an unshown hoisting drum of a power window mechanism can be put. This is put into rotation by the gear wheel 2 and adjusts this way a window between its end positions.

Due to the gradient of the worm gear 6, an axial force F has an effect on the gear wheel 2. In order to avoid an axial movement of the gear wheel 2 that would result from that, axial securing elements 8 are provided, which are fixed after the mounting (FIG. 2) at the axis 3 made of plastic.

The securing elements comprise a molded part 9 with a through hole 10 for incorporating a screw 11 that is arranged as thread forming screw. The molded part 9 provides three nibs 12, which are arranged by 120° in circumferential direction and off-standing in radial direction and which run sloped radially inwards to the circumferential wall of the through hole 10. In the drawing extract below the radial nibs 12 a circumferentially closed ring sector 13 is provided, which serves as a direct axial stop for the gear wheel 2, as it can be seen in FIG. 2. An inner shoulder 18 of the gear wheel 2 supports itself in an axial direction at the ring section 13 of the molded part 9. The molded part 9 on the hand is supported in an axial direction at the screw head 14 of the screw 11, which is screwed into a centric blind hole 15 in the axis 3. Therefore, the molded part 9 is jammed between the screw head 14 and the axis 3.

In mounted status, the molded part 9 is incorporated in a front sided recess 16 of the axis 3 over its entire axial length. For each nib 12 a radial slot 17 is provided, which is opened upwards axial in the drawing extract and through which the nibs 12 stick out in a radial direction over the circumferential outline of the axis 3. The radial slots 17 create simultaneously a rotation prevention for the molded part 9.

A ring seal 19 is arranged between the ring section 13 and an internal circumferential shoulder 18, with which the axis 3 is sealed against gear wheel 2. In mounted status, the ring section 13 of the molded part 9 presses the ring seal 19 in its seal seat. The compression of the seal is exactly defined due to being put on the circumferential shoulder 20 of the gear wheel.

It can be seen in FIGS. 1 and 2, that a cutoff wall 22 is provided between the blind hole 15 and a drying room 21 on the inside of the hollow axis 3, with which the penetration of water or moisture from the wet room (blind hole 15) into the transmission room (drying room 21) is avoided.

Due to the axis 3 being made of plastic according to the invention, it is possible to arrange the axis 3 in one piece with a transmission housing 23 made of plastic.

In order to compensate shear forces F, the axis 3 is supported in a forming hole 24 (draft) of a bearing part 25 made of plastic or metal in a radial direction.

The mounting of the transmission arrangement 1, according to the invention, takes place as follows:

At first, the gear wheel 2 is put on the axis 3 and the seal ring put into its seal seat (shoulder 18). Subsequently the molded part 9 is put in a targeted manner into the front sided recess 16 of the plastic axis 3, whereby each nib 12 axially slides into the corresponding radial slot. For a better finding, the radial slots 17 have inlet slopes 26 that run in an axial direction. At the end of the joining process, the ring section lies on the ring seal 19 with its lower side in the drawing extract. Simultaneously, a small slot still exists between the three nibs 12 and the slot bottoms 27. Subsequently, the screw 11 that is arranged as a thread forming screw is put into the through hole 10 of the molded part 9 until it sits on the bottom 28 of a cylindrical clearance 29. The screw 11 is then screwed into the cylindrical blind hole 15, whereby an internal thread is grooved into it. When the starting torque is achieved at the end of the screw process, the three nibs abut solidly at the slot bottom 27 with its undersides. Simultaneously, the ring section 13 presses on the ring seal 19.

When an axial force F has an impact the circumferential shoulder 20 of the gear wheel 2 presses against the ring section 13 of the molded part 9, whereby the gear wheel 2 is axially secured, which means it can only rotate radial on the axis by an axial function play, but not move axially.

Figures 5, 6:
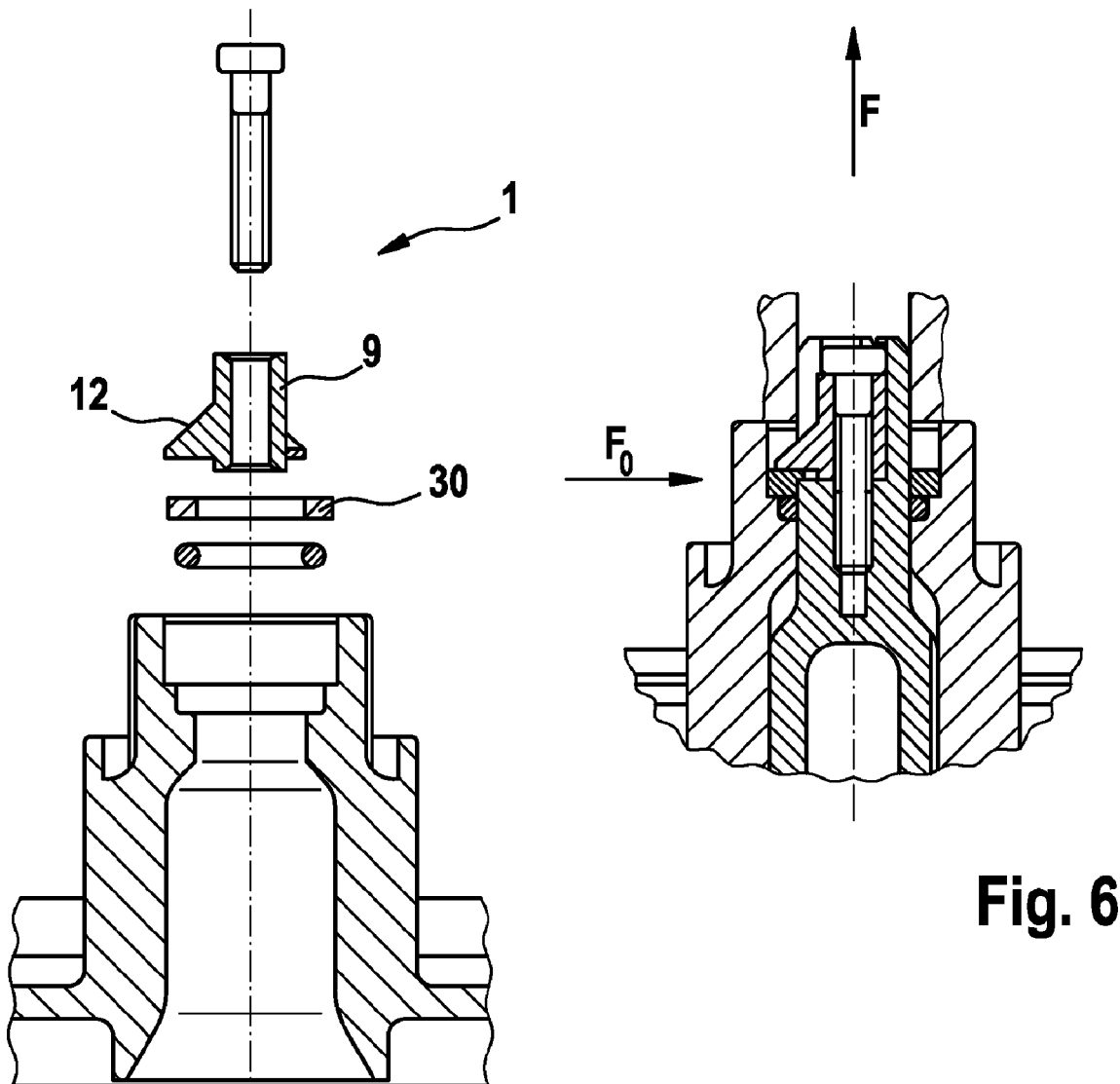
FIG. 5 is a further embodiment of a transmission arrangement in an explosion illustration.
FIG. 6 is the transmission arrangement that is shown in FIG. 5 in a mounted status.

FIGS. 5 and 6 show an alternative embodiment. In the following it is only referred to the differences to the previously described embodiment to avoid repetitions. As to the similarities, it is referred to the previous description.

At the embodiments according to FIGS. 5 and 6, the ring section 13 is arranged as separate ring part 30. That ring part 30 creates the essential axial stop for a direct, which means mediate support of the gear wheel 2, whereby the ring part 30 is supported in an axial direction at the nibs 12 of the molded part 9. The molded part 9 serves therefore for a direct support of the gear wheel 2 in the axial direction. Apart from that, the illustrated embodiment corresponds with the previously described first embodiment.

Due to the screw joint of the molded part 9 with the axis 3 or a shaft according to the invention a repair solution is created, because the molded part 9, the ring seal 19, the gear wheel 2 and, if necessary, the separate ring part 30 can be disassembled by unscrewing the screw 11 and subsequently assembled back onto the plastic axis 3 or a plastic shaft.

The invention claimed is:

1. A transmission arrangement comprising:
a gear wheel that is secured against an axial displacement on a shaft by a plurality of securing elements, wherein the shaft is made of a plastic, and wherein the plurality of securing elements comprise at least a molded part that has at least one axial stop configured for one of: a) a direct; and b) an indirect support of the gear wheel, wherein the molded part is secured by a screw against axial displacement on the shaft, and wherein at least a portion of the molded part is positioned within a front sided circumferential recess of the shaft.

2. The transmission arrangement of claim 1, wherein the screw is a thread forming screw that is screwed into a blind hole, wherein the blind hole is thread-free before assembly.

3. The transmission arrangement of claim 1, wherein the molded part is incorporated over its entire axial length and wherein a screw head of the screw is positioned within the front sided circumferential recess of the shaft.

4. The transmission arrangement of claim 1, wherein the at least one axial stop is created by one of: a circumferentially closed ring section of the molded part and a separate circumferentially closed ring part.

5. The transmission arrangement of claim 4, wherein the at least one axial stop lies on a ring seal that seals the shaft against the gear wheel.

6. The transmission arrangement of claim 5, wherein the at least one axial stop is supported by at least one radial nib of the molded part.

7. The transmission arrangement of claim 6, wherein three of the radial nibs are arranged equally distributed over a circumference of the molded part.

8. The transmission arrangement of claim 7, wherein for each of the radial nibs a radial slot is provided in a circumferential wall of the front sided circumferential recess of the shaft and therein each of the radial nibs extends in a radial direction over a circumferential outline of the shaft.

9. The transmission arrangement of claim 8, wherein at least one of the radial slots provides an inlet slope for the corresponding radial nib.

10. The transmission arrangement of claim 1, further comprising a radial support for the shaft, wherein the radial support comprises of a bearing part with a forming hole.

11. The transmission arrangement of claim 5, wherein the ring seal is an O-ring seal.

12. The transmission arrangement of claim 1, wherein the molded part is co-extensive with the shaft along an entire axial length of the molded part.

13. A securing arrangement for attaching a drive member of a drive train to a shaft of the drive train, the securing arrangement comprising:
an end portion of the shaft adjacent an end of the shaft, the end portion including an interior recess extending from the end of the shaft to an end of the interior recess, the end portion including a wall between the interior recess and an outer circumference of the end portion of the shaft, and at least one slot extending between the interior recess and the outer circumference through the wall; and
a securing element including an inner portion positioned within the interior recess, an axial stop, and at least one nib extending between the inner portion and the axial stop, the at least one nib positioned through a corresponding one of the at least one slot, and the axial stop positioned outside the outer circumference of the end portion of the shaft.

14. The securing arrangement of claim 13, wherein the drive member is a gear wheel.

15. The securing arrangement of claim 13, wherein the interior recess is substantially cylindrical and concentric with an axis of the shaft.

16. The securing arrangement of claim 13, wherein the outer circumference of the end portion of the shaft is substantially cylindrical and wherein the axial stop includes a circumferentially closed ring section.

17. The securing arrangement of claim 16, wherein the at least one slot includes three slots equally spaced about the outer circumference of the end portion of the shaft.

18. The securing arrangement of claim 13, wherein the at least one slot is a radial slot.

19. The securing arrangement of claim 13, further comprising a threaded fastener that fastens the securing element to the end portion of the shaft.

20. The securing arrangement of claim 19, wherein the securing element includes a hole and the end portion of the shaft includes a hole positioned at the end of the interior recess, wherein the threaded fastener is positioned within the holes of the securing element and the end portion of the shaft, and wherein threads of the threaded fastener engage the hole of the end portion of the shaft.

* * * * *